(12) United States Patent
Rangell

(10) Patent No.: US 6,203,602 B1
(45) Date of Patent: Mar. 20, 2001

(54) WATER PROOF CHALK LINE COMPOSITIONS FOR USE WITH CHALK LINE DEVICES

(76) Inventor: Robert K. Rangell, P.O. Box 424, Mokelumne Hill, CA (US) 95245-0424

( * ) Notice: Subject to any disclaimer, the term of this patent is extended or adjusted under 35 U.S.C. 154(b) by 0 days.

(21) Appl. No.: 09/301,783

(22) Filed: Apr. 29, 1999

(51) Int. Cl.⁷ ............................. C09D 13/00; B05D 5/00
(52) U.S. Cl. ............................ 106/31.01; 106/21.09; 427/286
(58) Field of Search .............. 106/31.01, 31.09; 242/397, 405; 33/414, 751; 427/286

(56) References Cited

U.S. PATENT DOCUMENTS

| | | | |
|---|---|---|---|
| D. 314,156 | * 1/1991 | Doyle | D10/61 |
| 3,016,616 | * 1/1962 | Matson et al. | 33/354 |
| 3,897,023 | * 7/1975 | Couch et al. | 242/388.8 |
| 4,731,933 | * 3/1988 | Cope | 33/414 |
| 5,476,722 | * 12/1995 | Sakamoto et al. | 428/511 |
| 5,699,622 | * 12/1997 | Umbro | 33/414 |
| 5,727,324 | * 3/1998 | Moore | 33/414 |

* cited by examiner

Primary Examiner—Helene Klemanski

(57) ABSTRACT

A water proof chalk line compositions for use with chalk line devices for snapping guide lines on wet surfaces that will not wash away when precipitation such as rain falls thereon. The water proof chalk line compositions for use with chalk line devices includes an effective amount of colored chalk mixed with an effective amount of concrete dye and applied to a moistened snap line of a chalk line device.

7 Claims, 2 Drawing Sheets

WATER PROOF CHALK LINE COMPOSITIONS FOR USE WITH CHALK LINE DEVICES

BACKGROUND OF THE INVENTION

1. Field of the Invention

The present invention relates to chalk line compositions for chalk line devices and more particularly pertains to a new water proof chalk line compositions for use with chalk line devices for snapping guide lines on wet surfaces that will not wash away when precipitation such as rain falls thereon.

2. Description of the Prior Art

The use of chalk line compositions for chalk line devices is known in the prior art. More specifically, chalk line compositions for chalk line devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,476,722 by Sakamoto et al.; U.S. Pat. No. 5,688,316 by Pettini et al.; U.S. Pat. No. 1,949,147 by Dove; U.S. Pat. No. 3,897,023 by Couch et al.; U.S. Pat. No. Des. 314,156 by Doyle; and U.S. Pat. No. 5,082,498 by Kurtz et al.

While these devices fulfill their respective, particular objectives and requirements, the aforementioned patents do not disclose a new water proof chalk line compositions for use with chalk line devices. The inventive device includes an effective amount of colored chalk mixed with an effective amount of concrete dye and applied to a moistened snap line of a chalk line device.

In these respects, the water proof chalk line compositions for use with chalk line devices according to the present invention substantially departs from the conventional concepts and designs of the prior art, and in so doing provides an apparatus primarily developed for the purpose of snapping guide lines on wet surfaces that will not wash away when precipitation such as rain falls thereon.

SUMMARY OF THE INVENTION

In view of the foregoing disadvantages inherent in the known types of chalk line compositions for chalk line devices now present in the prior art, the present invention provides a new water proof chalk line compositions for use with chalk line devices construction wherein the same can be utilized for snapping guide lines on wet surfaces that will not wash away when precipitation such as rain falls thereon.

The general purpose of the present invention, which will be described subsequently in greater detail, is to provide a new water proof chalk line compositions for use with chalk line devices apparatus and method which has many of the advantages of the chalk line compositions for chalk line devices mentioned heretofore and many novel features that result in a new water proof chalk line compositions for use with chalk line devices which is not anticipated, rendered obvious, suggested, or even implied by any of the prior art chalk line compositions for chalk line devices, either alone or in any combination thereof.

To attain this, the present invention generally comprises an effective amount of colored chalk mixed with an effective amount of concrete dye and applied to a moistened snap line of a chalk line device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water proof chalk line compositions for use with chalk line devices apparatus and method which has many of the advantages of the chalk line compositions for chalk line devices mentioned heretofore and many novel features that result in a new water proof chalk line compositions for use with chalk line devices which is not anticipated, rendered obvious, suggested, or even implied by any of the prior art chalk line compositions for chalk line devices, either alone or in any combination thereof.

It is another object of the present invention to provide a new water proof chalk line compositions for use with chalk line devices which may be easily and efficiently manufactured and marketed.

It is a further object of the present invention to provide a new water proof chalk line compositions for use with chalk line devices which is of a durable and reliable construction.

An even further object of the present invention is to provide a new water proof chalk line compositions for use with chalk line devices which is susceptible of a low cost of manufacture with regard to both materials and labor, and which accordingly is then susceptible of low prices of sale to the consuming public, thereby making such water proof chalk line compositions for use with chalk line devices economically available to the buying public.

Still yet another object of the present invention is to provide a new water proof chalk line compositions for use with chalk line devices which provides in the apparatuses and methods of the prior art some of the advantages thereof, while simultaneously overcoming some of the disadvantages normally associated therewith.

Still another object of the present invention is to provide a new water proof chalk line compositions for use with chalk line devices for snapping guide lines on wet surfaces that will not wash away when precipitation such as rain falls thereon.

Yet another object of the present invention is to provide a new water proof chalk line compositions for use with chalk line devices which includes an effective amount of colored chalk mixed with an effective amount of concrete dye and applied to a moistened snap line of a chalk line device.

Still yet another object of the present invention is to provide a new water proof chalk line compositions for use with chalk line devices that lets a construction crew work through wet weather when snapping guide lines with a chalk line device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
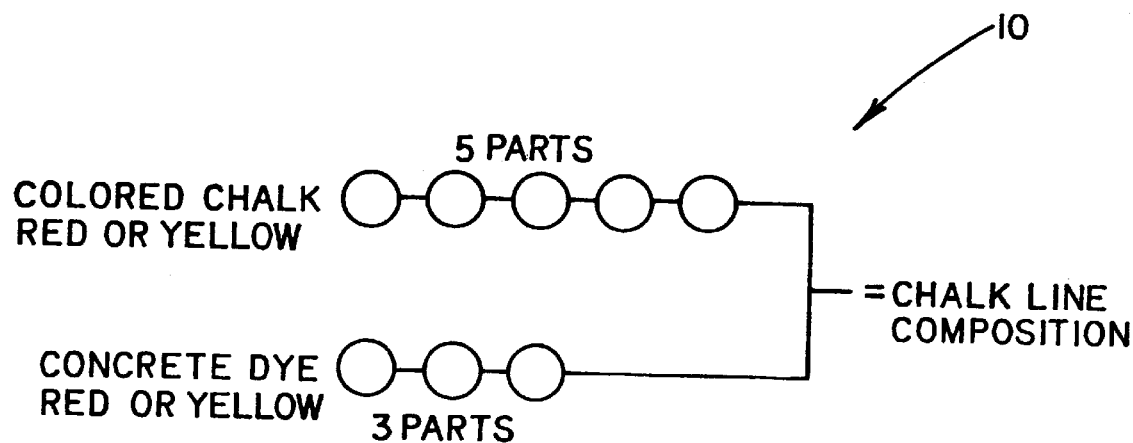
FIG. 1 is a schematic illustrative of the components of water proof chalk line composition for use with chalk line devices according to the present invention.
Figure 2:
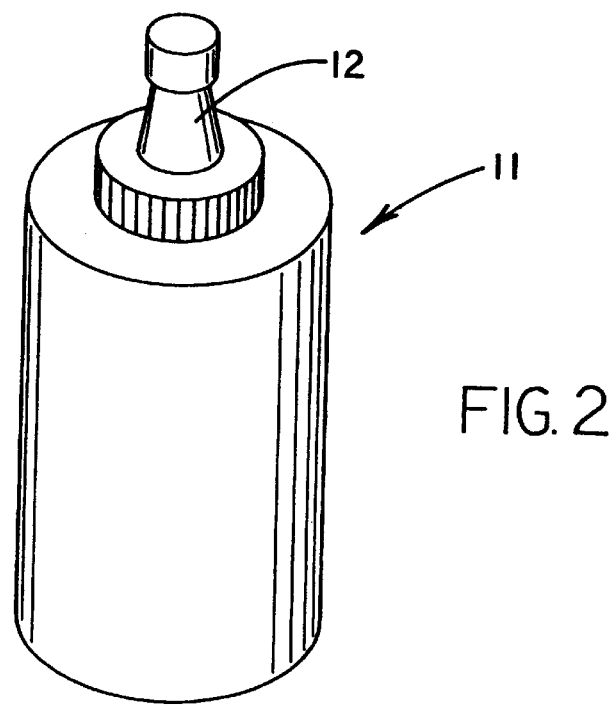
FIG. 2 is a schematic perspective view of a squeeze bottle container of the present invention.
Figure 3:
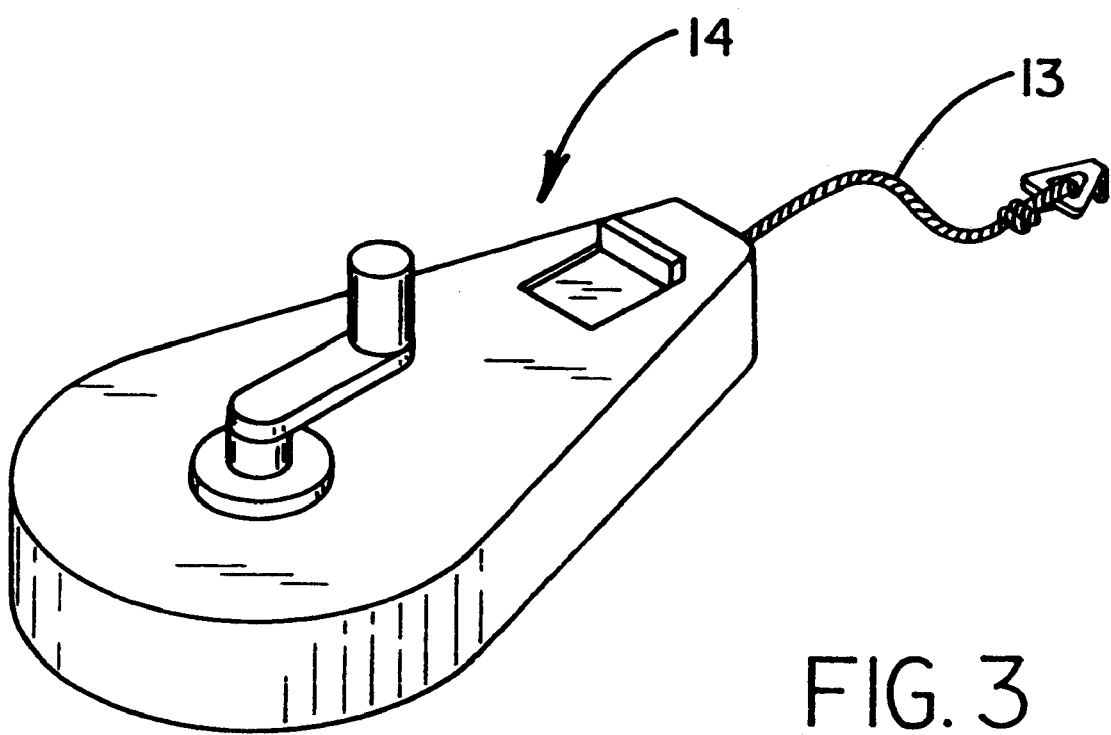
FIG. 3 is a schematic perspective view of a retractable chalk line device of the present invention.

With reference now to the drawings, and in particular to FIGS. 1 through 3 thereof, a new water proof chalk line compositions for use with chalk line devices embodying the principles and concepts of the present invention and generally designated by the reference numeral 10 will be described.

As best illustrated in FIGS. 1 through 3, the water proof chalk line compositions 10 for use with chalk line devices generally comprises an effective amount of colored chalk mixed with an effective amount of concrete dye and applied to a moistened snap line of a chalk line device.

In closer detail, the chalk line composition 10 is prepared by mixing an effective amount of colored chalk comprising calcium carbonate with an effective amount of concrete dye comprising mineral pigments or iron oxide. Preferably, the effective amount of colored chalk comprises five parts by volume and the effective amount of concrete dye comprises three parts by volume. The colored chalk and the concrete dye each preferably have either a red or yellow color. Preferably, colored chalk and concrete dye of the same color are mixed together so that the chalk line composition has the same color as the colored chalk and concrete dye. When both red and yellow colored chalk and concrete dye are used, the color of the chalk line compositions is a shade of orange.

Other usuable although less preferred mixtures of the composition include: (1) four parts by volume color chalk to four parts by volume concrete dye; (2) five parts by volume color chalk to two parts by volume concrete dye; and (3) six parts by volume color chalk to three parts by volume concrete dye.

The chalk line composition may then be in a squeeze bottle container 11 having a pouring nozzle 12. To apply the chalk line composition, a portion of a snap line 13 extending from a chalk line device 14 is moistened with water. The chalk line composition is then applied along a length of the moistened portion of the snap line extending from the chalk line device with the pouring nozzle of the squeeze bottle container to coat the moistened portion of the snap line with the chalk line composition. At this point the extended portion of the snap line may be retracted back in the chalk line device until needed for use.

Next, the snap line is stretched taut outwardly from the chalk line device adjacent a surface. The snap line is then snapped against the surface to form a guide line with the chalk line composition transferred from the snap line on to the surface. The formed guide line may be made on wet surfaces and will not wash away in the rain or when water flows over the surface.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A chalk line composition for applying to a snap line of a chalk line device, chalk line compositions comprising:

an effective amount of colored chalk;

an effective amount of concrete dye; and wherein said effective amount of colored chalk comprises five parts by volume, and wherein said effective amount of concrete dye comprises three parts by volume.

2. The chalk line composition of claim 1, wherein said colored chalk has a color selected from the group consisting of red and yellow.

3. The chalk line composition of claim 1, wherein said concrete dye has a color selected from the group consisting of red and yellow.

4. A chalk line composition for applying to a snap line of a chalk line device, chalk line compositions comprising:

an effective amount of colored chalk comprising calcium carbonate, wherein said effective amount of colored chalk comprises five parts by volume, wherein said colored chalk has a color selected from the group consisting of red and yellow; and an effective amount of concrete dye, wherein said effective amount of concrete dye comprises three parts by volume, wherein said concrete dye has a color selected from the group consisting of red and yellow.

5. A method for forming a guide line on a surface comprising the acts of:

mixing an effective amount of colored chalk with an effective amount of concrete dye to form a chalk line composition;

moistening a portion of a snap line extending from a chalk line device;

applying said chalk line composition along a length of said moistened portion of said snap line extending from said chalk line device;

stretching said snap line outwardly from said chalk line device adjacent a surface;

snapping said snap line against said surface to form a guide line with said chalk line composition transferred from said snap line on to said surface;

pouring said chalk line composition in a container having a pouring nozzle, wherein act of applying said chalk line composition along a length of said moistened portion of said snap line extending from said chalk line device further comprises the act of applying said chalk line composition to said moistened portion of said snap line with said pouring nozzle of said container to coat said moistened portion of said snap line with said chalk line composition; and wherein said effective amount of colored chalk comprises five parts by volume, and wherein said effective amount of concrete dye comprises three parts by volume.

6. The method of claim 5, wherein said colored chalk and said concrete dye each have a color selected from the group consisting of red and yellow.

7. The method of claim 6, wherein said act of moistening a portion of a snap line extending from a chalk line device, further comprises the act of moistening a portion of a snap line extending from a chalk line device with water.

* * * * *